United States Patent [19]

Morgan et al.

[11] Patent Number: 5,049,436
[45] Date of Patent: Sep. 17, 1991

[54] BROAD SEALING MULTI-LAYERED OPP FILMS WHICH YIELD HERMETIC SEALS

[75] Inventors: Kevin P. Morgan; Eldridge M. Mount, III, both of Fairport, N.Y.

[73] Assignee: Mobil Oil Corporation, Fairfax, Va.

[21] Appl. No.: 535,685

[22] Filed: Jun. 11, 1990

[51] Int. Cl.$^5$ .............................................. B32B 7/02
[52] U.S. Cl. .................................... 428/213; 428/215; 428/216; 428/331; 428/349; 428/461; 428/516
[58] Field of Search ............... 428/461, 344, 347, 349, 428/354, 355, 352, 353, 216, 500, 515

[56] References Cited

U.S. PATENT DOCUMENTS

| | | |
|---|---|---|
| 4,604,322 | 8/1986 | Reid . |
| 4,618,527 | 10/1986 | Doyen . |
| 4,692,380 | 9/1987 | Reid . |
| 4,888,237 | 12/1989 | Balloni et al. ........................ 428/349 |

*Primary Examiner*—Merrell C. Cashion, Jr.
*Assistant Examiner*—D. S. Nakarani
*Attorney, Agent, or Firm*—Alexander J. McKillop; Charles J. Speciale

[57] ABSTRACT

A multilayer film is hermetically heat sealable over a broad temperature range. In one embodiment, a heat sealable layer is provided to a polypropylene core layer. The heat sealable layer comprises an ethylene-propylene copolymer and/or an ethylene-propylene-butene terpolymer with an inorganic antiblock agent having a particle size of at least 0.8 micron and at least about 1000 ppm of a fatty acid amide, the layer having a thickness of at least about 10-25% of the total film thickness. A metal-receiving layer may be provided to a surface of the core layer opposite the heat-sealable layer and the film may be metallized.

15 Claims, No Drawings

BROAD SEALING MULTI-LAYERED OPP FILMS WHICH YIELD HERMETIC SEALS

BACKGROUND OF THE INVENTION

The invention relates to a film which is metallizable, has good machinability and which is heat sealable over a broad temperature range. It is desirable to have a broad sealing temperature range to increase the productivity of packaging machines.

Oriented polypropylene films with thin sealable surface layers of ethylene-propylene copolymers or ethylene-propylenebutene-1 terpolymers have been used in packaging operations. However, these films have not yielded hermetic seals on bags made with the films on packaging machines operated at standard conditions. Hermetic seals are required when leak-free packaging is important. In addition, the inclusion of metallized layers in machineable packaging films is often desirable. Metallized films have proven to be useful in many flexible packaging applications. Such films have often included a polypropylene core with a surface layer to which a metal layer is adhered and another surface layer which is heat sealable.

Important properties of films used on packaging machines are the machinability of the film and the heat sealability of the film. In addition, the formation of hermetic seals may be desired. At the same time when using metallized film, a metal layer must adhere to the underlying film substrate throughout the packaging operation and beyond.

The heat sealability, machinability, lamination bond strength and metal adherence properties of the film each can be improved by various factors which in turn may have detrimental effects on the other properties.

Machinability can be improved by improving the coefficient of friction (COF). In the past, coefficient of friction characteristics of polypropylene and other thermoplastic films have been modified by the inclusion in the polymer core of fatty acid amides which tend to bloom or migrate to the surface in order to reduce the coefficient of friction. In addition, finely divided inorganic anti-block agent has been incorporated into surface or skin layers to reduce the coefficient of friction of the film. The use of these additives is disclosed, for example, in U.S. Pat. No. 4,618,527 which describes a film having fatty acid amide in a polypropylene core and inorganic anti-block in skin layers which can have a thickness up to 10% of the total thickness of the film.

U.S. Pat. Nos. 4,604,322 and 4,692,380 describe a metallizable film having 0.03-0.15% by weight of fatty acid amide in a polypropylene core, a metal adhering surface layer of propylene ethylene copolymer having no slip agent, and a heat sealable polymer coating. However, since fatty acid amide blooms to the surface, when incorporated into the core layer the amide can bloom to a metal-receiving layer and interfere with metal adhesion.

A method was devised for improving metal adhesion in U.S. Pat. No. 4,888,237. This patent describes a metallized polymeric film with an isotactic polypropylene core and a metalreceiving layer which is flame treated to improve metal adhesion. Also present is a heat seal surface layer which can contribute 2.5-9% of the total weight of the film and which can contain 0.4 weight percent anti-block and 900 ppm fatty acid amides. However, the problem still remained to attain a metallizeable film with good metal adherence and good machinability which is capable of forming hermetic seals over broad temperature ranges.

Accordingly, it is an object of the invention to provide a metallizable film with low COF on both film surfaces for good operability on packaging machines, high metal adhesion, high lamination bond strengths, good appearance, which also yields hermetic seals over a broad temperature range on bags made with the film on packaging machines operated at standard conditions.

SUMMARY OF THE INVENTION

In accordance with the present invention a multilayer film is provided which is hermetically sealable over a broad temperature range. The sealing range is at least about 20° F., preferably at least about 30° F. and most preferably at least about 50° F. The film has at least one heat sealable layer consisting of an ethylene-propylene-butene terpolymer, an ethylene-propylene copolymer or blends thereof. In the heat sealable layer are an inorganic antiblock agent and at least about 0.1 weight percent or 1000 ppm of a fatty acid amide which provide optimum machinability. The heat sealable layer has a thickness of at least about 10% of the total film thickness. The proportion of the total film which the heat sealable layer occupies can also be expressed as at least about 10% of the total weight of the film.

More particularly, the invention is a metallizable multilayer film which is hermetically sealable over a broad temperature range, the film comprising:

A. a metal-receiving layer of a thermoplastic polymer of isotactic polypropylene, ethylene-propylene copolymer, atactic polypropylene or blends thereof, B. a core layer of high crystallinity isotactic polypropylene, C. a heat sealable layer of ethylene-propylene copolymer, ethylene-propylene-butene terpolymer or blends thereof, a block-reducing proportion of a finely divided inorganic material, at least 1000 ppm of a fatty acid amide, the layer having a thickness of at least about 10% of the weight or thickness of the total film structure.

Advantageously, the film:

1. Is hermetically heat sealable over a broad temperature range;
2. Has good machinability;
3. Has a desirable low COF;
4. Has good metal adhesion;
5. Has good lamination bond strength, particularly on the metallized side;
6. Has good appearance.

For a better understanding of the present invention, together with other and further objects, reference is made to the following description and its scope will be pointed out in the appended claims.

DETAILED DESCRIPTION OF THE INVENTION

The core layer B can be derived primarily from high crystallinity isotactic polypropylene. The preferred polypropylenes are well known in the art and are formed by polymerizing propylene in the presence of stereospecific catalyst systems. They can have a melt index at 230.C ranging from about 0.1-25. The crystalline melting point is about 160° C. The number average molecular weight ranges from about 25,000 to about 100,000. The density ranges from about 0.90-0.91. The isotacticity ranges from 92-97%.

A metallizable layer A is located on one surface of the core layer. The A layer can consist of polyolefin such as isotactic polypropylene, ethylene-propylene copolymers, or blends of isotactic polypropylene, ethylene-propylene copolymer and a minor amount of atactic polypropylene. Preferably the polyolefin A layer contains at least about 60 weight percent polypropylene. More preferably, the A layer consists of the same homopolymer polypropylene used for the core layer, or ethylene-propylene copolymer of about 0.5-4.5 weight percent ethylene. The A layer side of the film may be treated to impart an energy density of from about 30 to about 60 dynes per centimeter as described in U.S. Pat. No. 4,888,237 which is herein incorporated by reference in its entirety.

Metallization may be carried out in accordance with known vacuum metallization procedures using metals such as aluminum, zinc, copper (and alloys thereof such as bronze), silver, gold, and the like with aluminum being preferred. A metal layer from about 100 to about 500 angstroms thick is suitable.

A heat-sealable layer C is positioned or the surface of the core layer opposite the A layer side. The C layer may consist of polyolefin of comparatively high stereoregularity such as ethylene-propylene random copolymer, ethylene-propylenebutene random terpolymers and blends thereof.

Suitable copolymers for layer C can contain from about 2 to about 7 weight percent ethylene, the balance being propylene. The copolymers can have a melt index at 230° C. generally ranging from about 2 to about !5, preferably from about 3 to about 8. The crystalline melting point is usually from about 125° C. to about 150° C. and the number average molecular weight is about 25,000-100,000. The density will usually range from about 0.89 to about 0.92 gm/cm$^3$.

Suitable terpolymers are those obtained from the random interpolymerization of from about 1 to about 8 weight percent ethylene, preferably from about 3 to about 6 weight percent ethylene with from about 65 to about 95 weight percent propylene preferably from about 86 to about 93 weight percent propylene and with butene-1 representing the balance. The melt index at 230° C. generally ranges from about 2 to about 16 with from about 3 to about 7 preferred. The crystalline melting point may range from about 100° C. to about 130° C. and the average molecular weight is about 25,000-100,000. The density is from about 0.89 to about 0.92 gm/cm$^3$.

The C layer contains both an organic slip agent and an inorganic antiblocking agent. Suitable organic slip agents include amides of water-insoluble monocarboxylic acids having from about 8 to about 24 carbon atoms and mixtures of these amides. Preferred are $C_{12}$-$C_{24}$ fatty acid amides. Specific examples of this class of amides are erucamide, oleamide, stearamide, and behenamide. It is preferred that this additive be included in the heat-sealable C layer in an amount of from about 0.1 to about 0.7 weight percent or about 1000-7000 ppm, with from about 0.2 to about 0.3 weight percent or about 2000-3000 ppm preferred. The fatty acid amide tends to bloom to the surface of the C layer. The presence of this slip agent provides low COF for excellent operability of packaging machines while allowing for strong lamination bond strengths in extrusion lamination.

The core layer B and metal-adhering layer A contain no slip agent. The slip agent is added to the C side only, because this increases the bloom to the C side while decreasing the bloom to the A side. This allows for good metal adhesion and good uniformity of metal deposition on the A side.

Also included in the C layer is an inorganic antiblocking agent. It is important to use an inorganic blocking agent with an average particle size of greater than about 0.8 microns, preferably about 1-5 microns. Suitable inorganic blocking materials include the Syloids, synthetic amorphous silica gels having a composition of about 99.7% $SiO_2$ and a particle size of about 2-4 microns, particularly Syloid 244, having a particle size of about 2.0 microns.

Also useful are Super Floss, a diatomaceous earth of the composition $SiO_2$ 92%, $Al_2O_3$ 44%, $Fe_2O_3$ 1.2%, having an average particle size of about 5.5 microns; and synthetic precipitated silicates such as Sipernat 44, having a composition of $SiO_2$ 42%, $Al_2O_3$ 36%, $Na_2O$ 22% and having a 3.5 micron mean particle size.

The amount of inorganic blocking agent added to the C layer is from about 0.1-0.4 wt. % or 1000-4000 ppm with from about 0.2 to about 0.3 wt. % or 2000-3000 ppm preferred. The combination of organic slip agent and inorganic antiblock agent along with the thickness of the C layer results in optimum machinability and good hermetic sealing, particularly when the operation is carried out on packaging machines.

The total film thickness of a film structure having layers A, B and C is from about 0.50 to about 1.0 mils, preferably from about 0.65 to about 0.85 mils. The thickness relationship of the layers is important. In particular, the C layer is provided as a relatively thick layer of 10%-25% percent of the total thickness of the film with from about 13% to about 22% preferred, and from about 16% to about 19% most preferred. Therefore, the C layer is advantageously from about 0.11 to about 0.17 mil in thickness when the total film is, for example, about 0.8 mil thick.

At the same time, the A layer is relatively thin, comprising 2.5-5.0% of the total thickness of the film, preferably 3.5-4.0%. The core layer is advantageously 70.0-87.5% of the film, preferably 77-80.5%. The film is suitable for lamination as an inner layer to another film or to other substrates.

The following examples are illustrative.

EXAMPLE 1

A 0.80 mil film was constructed as follows:

A 0.63 mil core (B layer) consisted of high crystallinity homopolymer polypropylene. This material had a melt flow of 4.2 and a DSC (Differential Scanning Calorimeter) melting point of about 162° C.

A 0.03 mil A layer consisted of homopolymer polypropylene identical to the core layer.

A 0.14 mil C layer consisting of ethylene-propylene copolymer with 0.3 weight percent of inorganic antiblocking agent (Syloid 244) and 0.2 wt. % of erucamide. The copolymer had a melt flow of 4.5-5.5, an ethylene content of 3.2 to 4.5 percent and a DSC melting point of 125° to 135° C.

The three layers were melted and coextruded. The coextrudate was quenched to 80°-110° F., reheated to 240°-280° F. and stretched in the machine direction (MD) 4-8 times using transport rolls operating at different speeds. After the desired MD orientation, the film was traversely (TD) oriented 7-9 times, at an appropriate temperature profile, in a tenter frame. The film was then flame treated on the A layer to 38-40 dynes/cm.

The film was metallized by vacuum deposition of aluminum and extrusion laminated with low density polyethylene to another oriented polypropylene film, which contained on the side not buried in the lamination, a heat sealable skin.

The aluminum metal layer retained good adhesion and uniformity.

Hermetic Seal Test

To test for hermetic seal, bags were produced on a Hayssen Ultima II packaging machine using the laminate described above in example 1. The machine was operated at standard conditions of 65 sealed bags per minute, lap seal arrangement, at 150 lb. jaw pressure, over a range of jaw temperatures. The bags were submerged in water under an eleven pound weight and the location of any leaks recorded.

The test determined the jaw temperature range (sealing range) in which hermetically sealed bags which were 100% leak free were produced with the film.

The use of the film of example 1 resulted in leak-free bags over Hayssen jaw temperatures of 250° F. to 300° F., a range of 50° F. In addition, in processing the film of example 1 into hermetically sealed bags, the packaging machine ran with no operability problems, such as film jams.

EXAMPLES 2-6

Films were produced and processed into sealed bags as in example 1 except that the C layer thickness was varied as shown in Table I. The core layer thickness was adjusted to maintain a 0.80 mil film and the temperature range for producing hermetic seals was determined.

TABLE I

| | | Hermetic Seal | |
|---|---|---|---|
| Example | C-Layer Thickness (mil) | Jaw Temperature (°F.) | Range (°F.) |
| 1 | .14 | 250-300 | 50 |
| 2 | .05 | no hermetic seal | — |
| 3 | .08 | 280-300 | 20 |
| 4 | .11 | 250-300 | 50 |
| 5 | .14 | 250-300 | 50 |
| 6 | .17 | 250-310 | 60 |

The data in Table I show the benefits of the film made according to the invention. Examples 1, 3, 4, 5 and 6 are compositions in accordance with the invention and show a broad hermetic sealing range. Example 2 is a comparative example and shows no hermetic sealing.

EXAMPLE 7

A film was made and processed into sealed bags according to example 1 except that the inorganic anti-blocking agent used was Kaopolite 1152, having the composition $SiO_2$ 55%, $Al_2O_3$ 44%, $Fe_2O_3$ 0.4%, having an average particle size of about 0.8 microns. The hermetic seal films made with this film experienced operability problems on packaging machines. Operability problems consisted of film jams in the machine. Therefore, the type of anti-blocking agent used is important.

EXAMPLES 8-14

Films were prepared according to example 1 except that the level of erucamide was varied and the films were not metallized. The films were tested for Slow Instron COF. The results are shown in Table 2.

TABLE 2

| Example | Erucamide Level (ppm) | COF |
|---|---|---|
| 8 | 0 | .80 |
| 9 | 1000 | .74 |
| 10 | 2000 | .41 |
| 11 | 3000 | .36 |
| 12 | 4000 | .34 |
| 13 | 6000 | .31 |
| 14 | 8000 | .26 |

EXAMPLES 15-21

Films were prepared according to example 1, laminated to another oriented polyproplene film, which contained on the side not buried in the lamination, a heat sealable skin; and level of erucamide was varied. The films were tested for Slow Instron COF. The results are shown in Table 3.

TABLE 3

| Example | Erucamide Level (ppm) | COF |
|---|---|---|
| 15 | 0 | .52 |
| 16 | 1000 | .45 |
| 17 | 2000 | .47 |
| 18 | 3000 | .31 |
| 19 | 4000 | .30 |
| 20 | 6000 | .33 |
| 21 | 8000 | .24 |

The results of examples 8-21 showed that less than 0.1 wt. % slip agent in the film begins to result in high COF on the C side which causes tracking problems on packaging machines.

EXAMPLE 22

Films were prepared according to example 1 and the erucamide level in the film was varied. The films were tested for lamination bond strength. The results showed that greater than 0.4 wt. % slip agent began to result in low lamination strengths caused by the migration of the slip agent to the metallized side.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A metallizable multilayer film which is hermetically heat sealable over a broad temperature range, the film comprising at least one heat sealable layer which comprises a polymer selected from a group consisting of ethylene-propylene-butene terpolymer, ethylene-propylene copolymer and mixtures thereof, a block-reducing proportion of an inorganic anti-block agent having an average particle size greater than about 0.8 microns and from 1000 ppm to about 7000 ppm of a fatty acid amide, the heat sealable layer having a thickness of at least 10 percent of the total film thickness.

2. The film of claim 1 which further comprises a core layer having first and second opposite surfaces,
 the heat sealable layer being present on the first core surface and a polyolefin layer being present on the second core surface.

3. The film of claim 2 wherein the core layer comprises polypropylene having an isotacticity of at least 80%.

4. The film of claim 3 wherein the polyolefin layer comprises homopolymer polypropylene.

5. The film of claim 2 wherein the film is metallizable on the polyolefin layer which is on the second core surface.

6. The film of claim 1 wherein the fatty acid amide is erucamide.

7. The film of claim 1 wherein the inorganic antiblock agent is a silica compound having a particle size of from about one micron to about 5 microns.

8. The film of claim 9 wherein the inorganic antiblock agent is present in an amount of from 1000 to about 4000 ppm.

9. The film of claim 2 wherein the film has a total thickness of from about 0.50 to about 1.0 mils and the heat sealable layer has a thickness of from about 10% to about 25% of the total thickness.

10. The film of claim 1 which further comprises a layer of aluminum on the metallizable layer.

11. The film of claim 1 wherein the film is hermetically sealable over a range of at least about 20° F.

12. A metallizable multilayer film which is hermetically heat sealable over a broad temperature range of at least about 20° F. which comprises:
   A. a metal-receiving layer comprising a thermoplastic polymer selected from the group consisting of isotactic polypropylene, ethylene-propylene copolymer, atactic polypropylene, and blends thereof,
   B. a core layer comprising high crystallinity isotactic polypropylene,
   C. a heat sealable layer comprising a member of a group consisting of ethylene-propylene copolymer, ethylene-propylene-butene terpolymer and mixtures thereof, from about 0.1 to about 0.4 wt. % of a finely divided inorganic material having an average particle size greater than about 0.8 micron and from about 2000 ppm to about 3000 ppm of a fatty acid amide, the heat sealable layer having a thickness of from about 13 to about 22 percent of the total film thickness.

13. The film of claim 12 wherein the total film thickness is from about 0.65 to about 0.85 mils.

14. The film of claim 14 wherein fatty acid amide is erucamide.

15. The film of claim 14 wherein the film is heat sealable over a range of at least about 50° F.

* * * * *